United States Patent [19]
Craig

[11] 4,173,269
[45] Nov. 6, 1979

[54] WET BRAKE OR CLUTCH
[75] Inventor: George A. Craig, Niles, Mich.
[73] Assignee: Clark Equipment Company, Buchanan, Mich.
[21] Appl. No.: 880,689
[22] Filed: Feb. 23, 1978
[51] Int. Cl.² .............................................. F16D 55/36
[52] U.S. Cl. ................................. 188/71.5; 188/71.6; 188/218 XL; 188/264 E; 192/70.2; 192/113 B
[58] Field of Search ................... 188/71.5, 71.6, 71.1, 188/73.2, 71.4, 218 XL, 264 E; 192/70.2, 70.12, 107 R, 113 B

[56] References Cited
U.S. PATENT DOCUMENTS

| | | | |
|---|---|---|---|
| 1,749,745 | 3/1930 | Walther | 188/218 XL |
| 2,519,865 | 8/1950 | Wellman | 192/107 R |
| 2,525,648 | 10/1950 | Butler | 188/218 XL |
| 2,831,552 | 4/1958 | Kershner | 188/71.4 |
| 3,081,842 | 3/1963 | Zindler et al. | 188/71.5 |
| 3,730,301 | 5/1973 | Heck et al. | 192/70.12 X |
| 4,037,694 | 7/1977 | Keese | 188/71.5 X |

FOREIGN PATENT DOCUMENTS 490412 2/1954 Italy .................................. 188/218 XL Primary Examiner—George E. A. Halvosa
Attorney, Agent, or Firm—Ernst H. Ruf

[57] ABSTRACT

In a multiple disc wet brake or clutch of the type having a disc pack wherein the plurality of alternate discs, that have projections extending radially inward for operative interconnection with a rotatable hub, are provided with a plurality of equiangularly spaced circumferential locating tangs extending radially outward from the peripheral outer surface of these discs, for locating these discs relative to the housing inner peripheral surface so as to permit the removal of the rotatable hub without causing substantial misalignment between the radially inward extending disc projections and the corresponding external splines on the rotatable hub to allow subsequent reinsertion of the rotatable hub into the disc pack.

15 Claims, 2 Drawing Figures

WET BRAKE OR CLUTCH

BACKGROUND OF THE INVENTION

1. Field of the Invention

The field of art to which this invention pertains includes fluid pressure operated mechanisms and more specifically multiple disc wet brakes and clutches.

2. Description of the Prior Art

Multiple disc wet brakes and clutches utilize disc packs that include a plurality of axially movable first discs having projections extending radially outwardly into an engagement with a housing. A plurality of axially movable second discs, intermediate adjacent ones of the first discs, have projections extending radially inward into engagement with a rotatable hub portion. In some applications, the second discs are provided with friction material on their oppositely disposed annular surfaces. These mechanisms are generally hydraulically actuated via a piston that is hydraulically pressurized. The friction developed between the interfacing surfaces of the first and second pluralities of discs restrains the rotation of the rotatable hub in a manner well known in the art.

Wet disc brakes of this type are often used in heavy duty vehicles, especially in conjunction with planetary axle ends wherein the rotatable hub is generally drivingly connected or integral with a rotating wheel hub. When it becomes necessary to service wheel hub bearings or oil seals, the wheel hub and consequently the rotatable brake hub are removed from the axle housing. Removal of the brake hub causes the pluralities of second discs to loose their vertical location relative to the brake hub. This is especially true in designs where, in order to permit unimpeded coolant flow between the disc pack and its housing, there is a significant annular cooling fluid clearance between the outer peripheral surface of the disc pack and its housing. It is the utilization of this cooling fluid clearance that will cause a vertical downward displacement of these second brake discs until there is physical abutment between the outer annular surfaces of the discs with the inner peripheral surface of the housing at their lowest vertical point. This vertical displacement of the second discs, of course, represents problems upon the attempted reinsertion of the brake hub upon the reassembly of the axle end.

Prior art attempts to alleviate the previously mentioned problem include the use of a separate splined pilot stub shaft for lining up or positively locating the second brake discs. One of several methods for use of this stub shaft includes the pressurization of the brake (so as to immobilize the first and second brake discs); removing the wheel hub while the brake is still pressurized; inserting the stub shaft while the brake is still pressurized; depressurizing the brake so that the necessary maintenance procedures can be carried out; repressurizing the brake; removing the stub shaft while the brakes are still pressurized; and finally, reassembling the axle end and thereby reinsert the brake hub portion within the clutch pack and thereafter depressurizing the brake.

SUMMARY OF THE INVENTION

In order to solve the problem of the vertical shifting of the second brake discs, as well as to alleviate the previously-noted cumbersome servicing methods, the second brake discs are provided with means for locating the second discs relative to the housing without causing excessive vertical displacement of the second brake discs. This locating means preferably takes the form of a plurality of equiangularly spaced locating tangs that extend radially outward from the peripheral outer surface of the second discs. The locating tangs are utilized for locating the second discs relative to the housing inner peripheral surface. Of course, a small running clearance has to remain between the outer end surface of the locating tangs and the inner peripheral surface of the housing. This disc running clearance which is much less than the cooling fluid clearance must also be less than the radial dimension of the lead chamfer of the hub splines, otherwise this lead chamfer will be unable to locate the openings between the inward projections of the second discs during the reinsertion of the hub portion into the disc pack cavity.

While the angular extent of the locating tangs is kept as short as possible, to minimize the obstruction of the annular cooling fluid clearance, the tang angular extent must be greater than the angular extent of the depressions that correspond to the radially outward extending projections of the first discs so that the locating tangs cannot locate therein.

Further features and advantages of this invention will be more readily understood by persons skilled in the art when following the detailed description in conjunction with the several drawings.

DESCRIPTION OF THE PREFERRED EMBODIMENT

Figure 1:
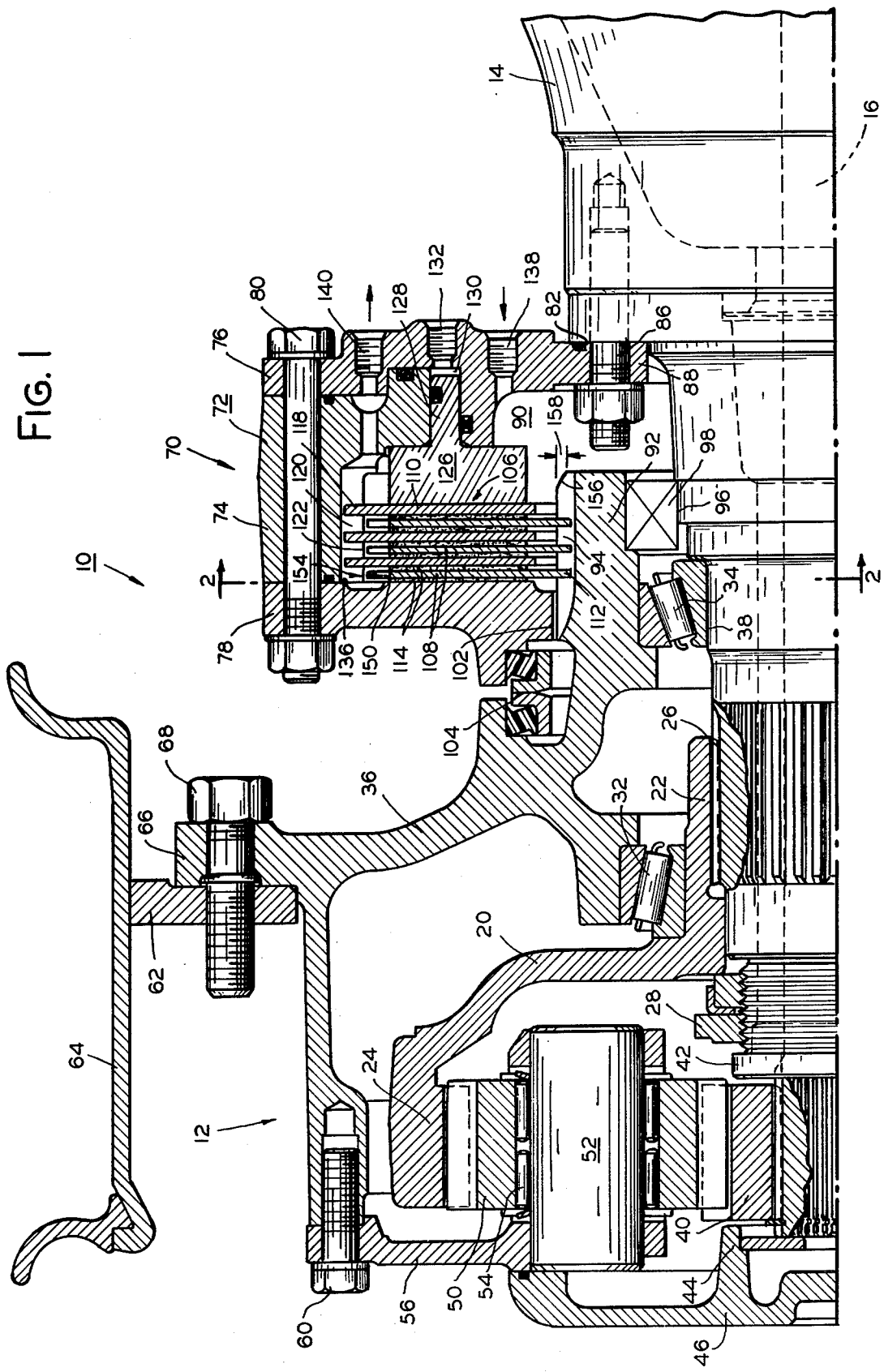
FIG. 1 is a fragmentary, partially sectioned view of a drive axle outer end embodying the improved wet brake assembly of the present invention.

Referring now to the drawings, specifically to FIG. 1, the reference numeral 10 generally denotes a drive axle equipped at each end (only one end of which is shown) with a planetary gear outer end assembly 12 and an axle housing 14 that contains a differential (not shown) drivingly connected to planetary assembly 12 via an axle drive shaft 16.

Planetary assembly 12 includes hub 22 of a mounting member 20 which supports planetary ring gear 24, with hub 22 being internally splined to axle housing 14 at 26. Mounting member 20 is confined against axial movement by a lock nut 28. A pair of opposed tapered roller-type antifriction bearings 32 and 34 combine to journal wheel hub 36, with outboard wheel hub bearing 32 having its inner race supported on hub 22 of mounting member 20 while the inner race of inboard bearing 34 is supported on shoulder 38 of axle housing 14. Mounting member 20 can be axially adjusted in order to properly preload bearings 32 and 34, with this adjustment also being accomplished via lock nut 28.

A sun gear 40 is splined to the outer end of axle drive shaft 16 and is axially restrained in position by an annular abutment member 42 attached to the outer end of axle housing 14 and annular rib member 44 that projects inwardly from closing cap 46. Sun gear 40 meshes with a plurality of equiangularly disposed planetary pinions 50 which are journalled, via bearings 54, on planet pins 52 that extend between and are affixed to the opposed walls of planetary pinion carrier 56. Planetary pinions 50 also mesh with internal ring gear 24.

Planetary pinion carrier 56 is fastened to wheel hub 36 by a plurality of machine bolts 60 and forms an apertured end plate which is closed by cap 46 fixedly secured to carrier 56. A wheel disc 62, carrying a wheel rim 64, is secured to flange 66 of wheel hub 36 in a conventional manner by a plurality of machine bolts 68.

In operation, the rotation of sun gear 40 by axle drive shaft 16 rotates planetary pinions 50 which in turn react against fixed internal planetary ring gear 24 thereby rotating carrier 56 which thus becomes the output element of planetary gear outer end assembly 12. The rotation of carrier 56 in turn causes the rotation of wheel hub 36 and consequently of wheel rim 64.

A multiple disc friction brake, generally designated by the numeral 70, is provided adjacent to and externally of wheel hub 36. Specifically, brake 70 includes a housing assembly 72 that is comprised of a central annular portion 74 that separates inner and outer apertured end plates 76 and 78, respectively. Plates 76 and 78 are sealingly attached to central portion 74 via a plurality of angularly spaced peripheral nut and bolt assemblies 80 passing therethrough. Housing assembly 72 is attached to vertical face portion 82 of axle housing 14 via a plurality of angularly spaced conventional stud and nut assemblies 86 that serve to sealingly attach lower flange portion 88 of inner end plate 76 to axle housing face portion 82.

Brake housing assembly 72 has a generally torusshaped inner cavity 90 and projecting thereinto is a cylindrical portion 92 of wheel hub 36, with portion 92, which acts as a brake hub, being provided with external splines 94. The inner peripheral surface of cylindrical portion or brake hub 92 is sealed, relative to shoulder 96 of axle housing 14 via seal member 98. Additional sealing between wheel hub 36 and brake outer end plate 78, relative to fluid leakage through splines 94 and inner peripheral surface 102 of outer end plate 78, is provided via a seal 104.

Brake 70 includes a disc pack 106 having a stack of axially movable but alternately disposed annular brake discs 108 and 110, with discs 108 being provided with a series of teeth or tabs 112 of any desired shape around their inner peripheries. Tabs 112 are received in the spaces between splines 94 on wheel hub cylindrical portion 92, thereby permitting discs 108 to move axially on splines 94 while at the same time rotating with wheel hub 36. Driven discs or rotors 108 preferably are provided with a friction material 114 on its oppositely disposed annular surfaces.

Interposed between rotatable discs 108 are stationary discs or stators 110 whose outer peripheries are provided with a series of spaced tabs or teeth 118 of any desired shape, with tabs 118 being at least partially received within correspondingly shaped depressions 120 in the inner peripheral surface 122 of brake central portion 74. Friction brake 70 thus provides a plurality of axially movable brake discs, with discs 110 serving as stator members fixed against rotation to brake portion 74 and brake discs 108 serving as rotors fixed for rotation with wheel hub 36.

Multiple disc friction brake 70 is hydraulically actuated by an annular piston 126, a portion 128 of which is disposed in a cavity 130 formed in brake housing assembly 72. Hydraulic fluid under pressure is supplied to cavity 130 by means of aperture 132 in inner end plate 76. A bleeder fitting (not shown) is provided to the hydraulic system in a manner well known in the art. Friction brake 70 is actuated by increasing the hydraulic fluid pressure in cavity 130 by a conventional means so as to move piston 126 to the left as shown in FIG. 1. This in turn moves brake discs 108 and 110 to the left until they abut inner surface 136 of outer end plate 78. The friction developed between the interfacing surfaces of brake discs 108 and 110 restrains the rotation of brake discs 108, thereby restraining the rotation of wheel hub 36.

As previously noted, brake inner cavity 90, in which the braking action due to discs 108 and 110 occurs, is sealed relative to wheel hub 36 and axle housing 14. In order to provide the required cooling, lubricating fluid is preferably continuously directed, via any conventional means (not shown), into cavity 90 via aperture 138 in end plate 76. After flowing through cavity 90 and thereby cooling discs 108 and 110, the lubricating fluid is exhausted from cavity 90 via aperture 140 in end plate 76 by any desired conventional means.

If it becomes necessary to service wheel hub bearings 32 and/or 34 as well as seals 98 and/or 104, then wheel hub 36 must be removed from axle housing 14. The removal of wheel hub 36 is accomplished upon the removal of lock nut 28 from axle housing 14, which in turn necessitates the initial removal of sun gear 40 and preferably of axle drive shaft 16, both of which can be removed after the prior removal of cap 46 or the removal of planet carrier 56, depending upon the size and dimensions of the various components of planetary gear assembly 12.

Figure 2:
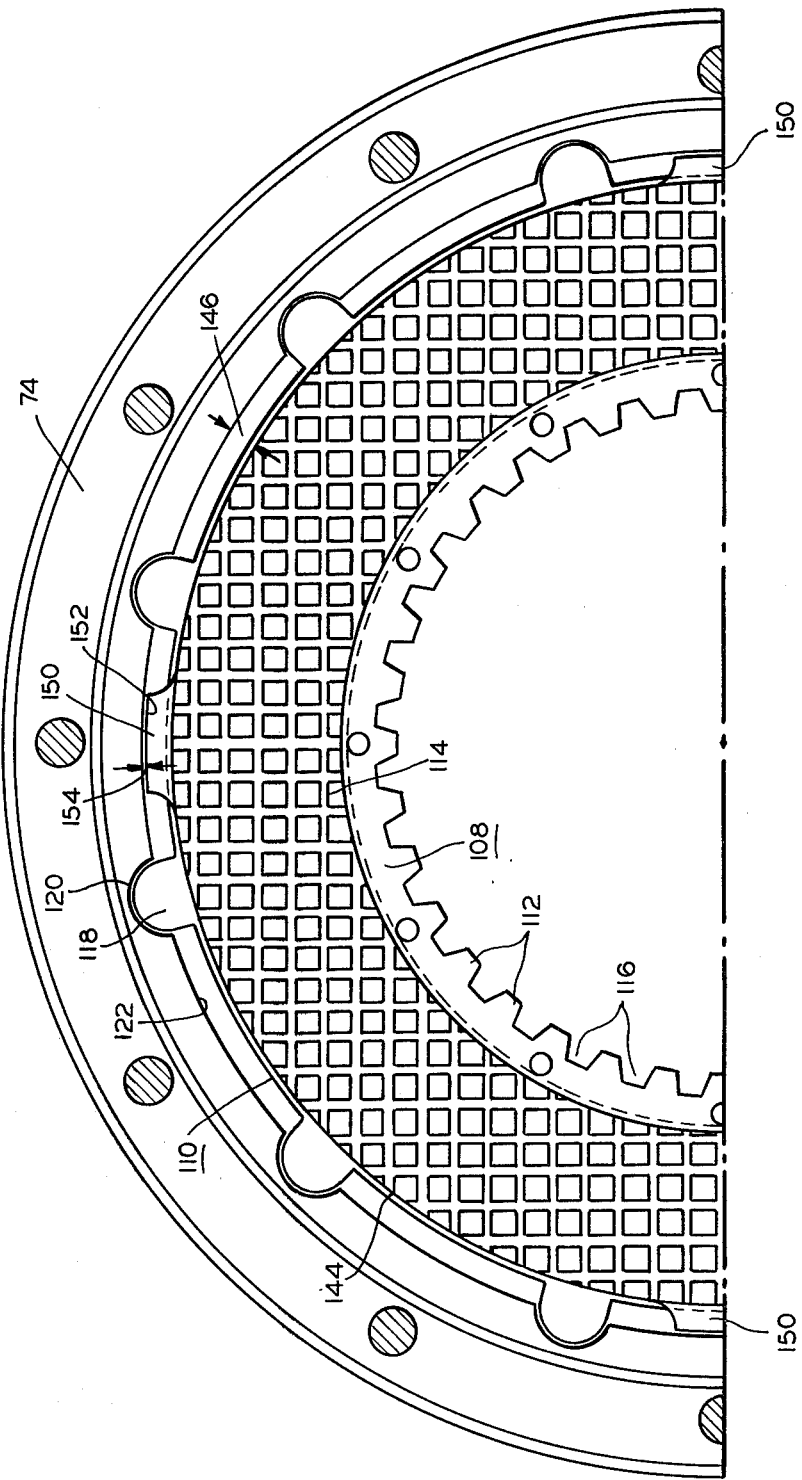
FIG. 2 is a fragmentary simplified view taken along line 2—2 of FIG. 1.

It should be noted that the removal of wheel hub 36 necessarily includes the removal of its cylindrical portion 92 thereby causing driven discs 108 to lose their vertical location relative to splines 94. As shown in FIG. 2, in order to permit unimpeded coolant flow between inner peripheral surface 122 of housing portion 74 and the outer peripheral surface 144 of brake discs 108, a significant annular fluid clearance therebetween, denominated by numeral 146, is generally deemed necessary. However, if a complete 360° annular fluid clearance 146 were utilized, the axial removal of wheel hub portion 92 would cause the vertical downward displacement of brake discs 108 until there would be physical abutment of disc outer annular surface 144 with inner peripheral surface 122 of brake portion 74 at their lowest vertical point. This vertical displacement of brake discs 108 would, of course, represents problems upon the attempted reinsertion of wheel hub portion 92 into brake cavity 90.

As best seen in FIG. 2, in order to forestall the problem of the vertical shifting of brake discs 108 and to alleviate the previously-noted cumbersome service method, a plurality of spaced locating tangs, guides or tabs 150 have been added to rotor peripheral surface 144. Naturally, a small running clearance, denominated by numeral 154, has to remain between outer end surface 152 of tangs 150 and inner peripheral surface 122 of housing portion 74. It should be understood that disc running clearance 154 must be less than the radial dimension, denominated by numeral 158 (FIG. 1), of lead chamfer 156 on one end of splines 94. Even the use of tangs 150 will allow a slight vertical drop (as much as the extent of disc running clearance 154) and, therefore, the extent of dimension 158 must exceed that of clearance 154, otherwise lead chamfer 156 will be unable to locate in the openings 116 between tabs 112 of discs 108 during the insertion of wheel hub portion 92 into cavity 90.

Several questions may, of course, be raised in regard to the use of locating tangs 150. One question is: Why not increase the outer diameter of brake disc 108 so that its surface 144 coincides with tang outer end surface 152? In a manner of speaking, this has been accomplished, but it is undesirable from a cooling fluid flow standpoint to have a low running clearance 154 on a complete periphery of discs 108. Basically, only a minimum of three equiangularly disposed locating tangs 150 are required, thus permitting the use of fluid clearance 146 through substantial annular space segments between discs 108 and housing portion 74. Therefore, the angular extent of locating tangs 159 is kept as short as possible; however, it must be greater than the angular extent of depressions 120 in the inner peripheral surface 122 of brake portion 74 so that tangs 150 cannot locate therein. Another question: Is it feasible to utilize brake discs 108 whose outer diameter 144 coincides with outer end surface 152 of tangs 150 and has a large number of recess cutouts, for example semi-circular in shape, thus leaving a large number of tabs 150? This modification is feasible as long as the angular extent of each tab is greater than the axial extent of depressions 120 in the manner previously described and there is sufficient fluid clearance.

It should, of course, be understood that the exact shape or number (in excess of three) of locating tangs 150 is not critical as long as the previously described angular extent and running clearance limitations (relative to the radial dimension 158 of lead chamfer 156 on splines 94) as well as the necessary fluid clearances are not violated. Furthermore, the shape of tabs or teeth 112 and their corresponding shapes on wheel hub cylindrical portion 92 are, of course, not restricted to those shown in the drawings. For example, tabs 112 could be shaped similar to tabs 118 if so desired.

It should be apparent at this time that the use of locating tangs 150 will permit the ready removal of wheel hub 36 from axle housing 14 without the need for first pressurizing brake 70 in order to keep rotatable discs 108 from sufficient vertical displacement to make subsequent reassembly virtually impossible. Furthermore, by keeping the disc running clearance at a value less than that of the radial dimension of the lead chamfer on the locating members of the wheel hub portion in contact with the driving discs, unencumbered reassembly of wheel hub 36 relative to axle housing 14 can readily be accomplished. At the same time, there will be minimum impedance to the lubricating flow relative to the brake discs.

From the foregoing, it is believed that those familiar with the art will readily recognize and appreciate the novel concepts and features of the present invention. Obviously, the locating tang concept is not limited to wet disc brakes but can also be readily applied to multiple plate fluid-pressure actuated clutches used in powershift types of transmissions, for example. While the invention has been described in relation to only one preferred embodiment, numerous variations, changes and substitutions of equivalents will present themselves to persons skilled in the art and may be made without necessarily departing from the scope and principles of this invention. As a result, the embodiment described herein is subject to various modifications, changes and the like, with the scope of this invention being determined solely by reference to the claims appended hereto.

What is claimed is:

1. In a wet disc brake for an axle outer end assembly of the type having an elongate axle housing; a wheel hub rotatably mounted on said housing by bearing means; means for imparting rotation to said wheel hub at one end of said housing; said disc brake being located near the other end of said housing and having a disc pack located within the brake housing, said disc pack including a plurality of axially movable first discs having projections extending radially outward into axially sliding engagement with retaining means on said brake housing and a plurality of axially movable second discs, intermediate adjacent ones of said first discs, and having projections extending radially inward; said wheel hub including a brake hub portion extending into said brake housing for operatively interconnecting said disc pack with said wheel hub via the axially sliding engagement of said radially inward extending second disc projections with retaining means on said brake hub portion; a generally annular cooling fluid clearance between the outer peripheral surface of said plurality of second discs and said brake housing inner peripheral surface; and means for circulating cooling fluid through said disc pack and said clearance, wherein said improvement comprises a plurality of spaced locating tangs extending radially outward from the peripheral outer surface of said second discs for locating said second discs relative to said brake housing inner peripheral surface so as to permit the removal of said wheel hub, and consequently of said brake hub portion, without causing misalignment between said second disc projections and said retaining means on said brake hub portion to the extent that this misalignment with prohibit subsequent reinstallation of said wheel hub and said annular cooling fluid clearance including a relatively smaller running clearance between said tangs and said brake housing inner peripheral surface.

2. The improved wet disc brake of claim 1 wherein said locating tangs are equiangularly spaced.

3. The improved wet disc brake of claim 1 wherein said retaining means on said brake hub portion takes the form of external splines, with the ends of each of said splines within said brake housing being provided with a lead chamfer for facilitating the entry of said splines between said radially inward projections of said second discs.

4. The improved wet disc brake of claim 3 wherein the radial dimension of each of said spline lead chamfers is greater than said running clearance so as to allow said lead chamfer to locate said splines between said radially inward second disc projections upon reinsertion of said brake hub into said disc pack.

5. The improved wet disc brake of claim 1 wherein said retaining means on said brake housing takes the form of axial depressions on said brake housing inner peripheral surface, said depressions substantially corresponding with the radially outward extending projections on said first discs and wherein the angular extent of said locating tangs is greater than the angular extent of said axial depressions on said brake housing inner peripheral surface so that said locating tangs cannot locate therein.

6. In a wet disc brake for an axle outer end assembly of the type having an elongate axle housing; a wheel hub rotatably mounted on said housing by at least two spaced bearings; means for imparting rotation to said wheel hub at one end of said housing; said disc brake being located near the other end of said housing and having a disc pack located within the brake housing, said disc pack including a plurality of axially movable first discs having projections thereon extending radially outward into axially sliding engagement with corresponding axial depressions on said brake housing inner peripheral surface and a plurality of axially movable second discs, intermediate adjacent ones of said first discs, and having projections extending radially inward; said wheel hub including a brake hub portion extending into said brake housing for operatively interconnecting said plurality of second discs with said wheel hub via the engagement of said radially inward extending second disc projections with splines on said brake hub portion; a generally annular cooling fluid clearance between the outer peripheral surface of said plurality of second discs and said brake housing inner peripheral surface; and means for circulating cooling oil through said disc pack and said clearance, wherein the improvement comprises a plurality of spaced locating tangs extending radially outward from the peripheral outer surface of said second discs for locating said second discs relative to said brake housing inner peripheral surface so as to permit removal of said wheel hub without causing such misalignment between said second disc projections and said brake hub portion splines that such misalignment will prohibit subsequent reinstallation of said brake hub portion because of vertical downward displacement of said second brake discs upon removal of said brake hub portion, said annular fluid clearance including a relatively smaller running clearance between the outer peripheral surface of said locating tangs and said brake housing inner peripheral surface.

7. The improved wet disc brake of claim 6 wherein each second disc is provided with at least three equiangularly spaced locating tangs.

8. The improved wet disc brake of claim 7 wherein the ends of each of said splines within said brake housing is provided with a lead chamfer for facilitating the entry of said splines between said radially inward projections of said second discs.

9. The improved wet disc brake of claim 8 wherein said running clearance is less than the radial dimension of each of said spline lead chamfers so as to allow said leaf chamfer to locate said splines between said radially inward second disc projections upon reinsertion of said brake hub portion into said disc pack.

10. The improved wet disc brake of claim 6 wherein the angular extent of said locating tangs is greater than the angular extent of said axial depressions of said brake housing inner peripheral surface thereby prohibiting the location of said tangs within said axial depressions.

11. In a fluid pressure operated brake or clutch of the type having a housing; a disc pack located within said housing, said disc pack including a plurality of axially movable first discs having projections extending radially outward into axially sliding engagement with retaining means on said housing and a plurality of axially movable second discs, intermediate adjacent ones of said first discs, and having projections extending radially inward; a rotatable hub portion extending into said housing for operatively interconnecting said disc pack with said rotatable hub portion via the axially sliding engagement of said radially inward extending second disc projections with retaining means on said rotatable hub portion; a generally annular cooling fluid clearance between the outer peripheral surface of said plurality of second discs and said housing inner peripheral surface; and means for circulating cooling fluid through said disc pack and said clearance, wherein the improvement comprises a plurality of spaced locating tangs extending radially outward from the peripheral outer surface of said second discs for locating said second discs relative to said brake housing inner peripheral surface so as to permit removal of said rotatable hub portion, without causing misalignment between said second disc projections and said retaining means on said rotatable hub portion to the extent that this misalignment will prohibit subsequent reinstallation of said rotatable hub portion, said annular cooling fluid clearance including a relatively smaller running clearance between the outer peripheral surface of said locating tangs and said housing inner peripheral surface.

12. The improved fluid pressure operated mechanism of claim 11 wherein said locating tangs are equiangularly spaced.

13. The improved fluid pressure operated mechanism of claim 12 wherein said retaining means on said rotatable hub portion takes the form of external splines, with the ends of each of said splines within said housing being provided with a lead chamfer for facilitating the entry of said splines between said radially inward projections of said second discs.

14. The improved fluid pressure operated mechanism of claim 13 wherein the radial dimension of each of said spline lead chamfers is greater than said running clearance so as to allow said lead chamfer to locate said splines between said second disc projections upon reinsertion of said rotatable hub portion.

15. The improved fluid pressure operated mechanism of claim 12 wherein said retaining means on said housing takes the form of axial depressions on said housing inner peripheral surface, with said depressions substantially corresponding with the radially outward extending projections on said first discs and wherein the angular extent of said locating tangs is greater than the angular extent of said axial depressions so that said locating tangs cannot locate therein.

* * * * *